(12) United States Patent
Kim et al.

(10) Patent No.: US 10,408,689 B2
(45) Date of Patent: Sep. 10, 2019

(54) APPARATUS AND METHOD FOR CONTROLLING A HIGH VOLTAGE BATTERY IN VEHICLE

(71) Applicants: Hyundai Motor Company, Seoul (KR); Kia Motors Corporation, Seoul (KR)

(72) Inventors: Woo Sung Kim, Gyeonggi-Do (KR); Dong Gil Ha, Gyeongsangnam-Do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 733 days.

(21) Appl. No.: 14/556,124

(22) Filed: Nov. 29, 2014

(65) Prior Publication Data

US 2016/0091374 A1   Mar. 31, 2016

(30) Foreign Application Priority Data

Sep. 25, 2014   (KR) ........................ 10-2014-0128682

(51) Int. Cl.
  *H01M 10/48*   (2006.01)
  *G01K 15/00*   (2006.01)
  (Continued)

(52) U.S. Cl.
  CPC ............ *G01K 15/005* (2013.01); *B60L 58/12* (2019.02); *H01M 10/486* (2013.01);
  (Continued)

(58) Field of Classification Search
  CPC ................................................... H01M 10/486
  (Continued)

(56) References Cited

U.S. PATENT DOCUMENTS

2004/0189260 A1* 9/2004 Kimoto ............ H01M 10/4207
                                                        320/150
2005/0275383 A1   12/2005 Ishishita
(Continued)

FOREIGN PATENT DOCUMENTS

CN       1713447 A      12/2005
CN     101313431 A      11/2008
(Continued)

OTHER PUBLICATIONS

First Chinese Office Action for Chinese Patent Application No. 201410805835.4, dated Dec. 5, 2018, 11 pages.

*Primary Examiner* — Min Huang
(74) *Attorney, Agent, or Firm* — Mintz Levin Cohn Ferris Glovsky and Popeo, P.C.; Peter F. Corless

(57) ABSTRACT

An apparatus and method are provided for controlling a high voltage battery within vehicle. The apparatus monitors states of a first temperature sensor and a second temperature sensor mounted within a battery pack and calculates a replacement temperature that corresponds to the faulty temperature sensor using a temperature deviation within the battery pack for each ambient temperature of the battery when a faulty temperature sensor of the first temperature sensor and the second temperature sensor is detected. The replacement temperature is then used to operate the battery, and thus the stability of the battery control is improved even though the temperature sensor of the battery fails.

10 Claims, 4 Drawing Sheets

(51) Int. Cl.
*B60L 58/12* (2019.01)
*H01M 10/625* (2014.01)
*H01M 10/633* (2014.01)
*H01M 10/635* (2014.01)
*H01M 10/6561* (2014.01)

(52) U.S. Cl.
CPC ....... *G01K 2205/00* (2013.01); *H01M 10/625* (2015.04); *H01M 10/633* (2015.04); *H01M 10/635* (2015.04); *H01M 10/6561* (2015.04); *H01M 2220/20* (2013.01); *Y02T 10/7005* (2013.01); *Y02T 10/705* (2013.01); *Y02T 10/7044* (2013.01)

(58) Field of Classification Search
USPC .......................................... 429/62
See application file for complete search history.

(56) References Cited

U.S. PATENT DOCUMENTS

| | | | | |
|---|---|---|---|---|
| 2006/0196954 A1* | 9/2006 | Okuda | ............... | H01M 10/486 236/49.3 |
| 2006/0223673 A1* | 10/2006 | Centlivre | ............. | B60W 10/06 477/181 |
| 2009/0136804 A1 | 5/2009 | Bono | | |
| 2011/0199053 A1* | 8/2011 | Minamiura | ......... | H01M 10/441 320/136 |
| 2013/0110373 A1* | 5/2013 | Nagashima | ......... | G01M 15/042 701/99 |
| 2013/0183554 A1 | 7/2013 | Takanezawa et al. | | |
| 2013/0224532 A1* | 8/2013 | Bengtsson | .......... | H01M 2/1072 429/7 |
| 2014/0076513 A1* | 3/2014 | Iwama | ............... | H05K 7/20209 165/11.1 |
| 2014/0242432 A1* | 8/2014 | Brown | ................ | H01M 10/482 429/90 |
| 2014/0286372 A1* | 9/2014 | Kobayashi | ........... | G01K 15/007 374/1 |
| 2014/0370940 A1* | 12/2014 | Yoshida | .............. | H01M 10/425 455/572 |
| 2015/0104680 A1* | 4/2015 | Wang | .................. | B60L 11/1874 429/50 |
| 2015/0147608 A1* | 5/2015 | Lin | ..................... | H01M 10/052 429/62 |
| 2015/0165919 A1* | 6/2015 | Hughes | ............... | B60L 11/1857 320/109 |
| 2016/0204478 A1* | 7/2016 | Iguchi | ............... | H01M 10/6563 429/62 |
| 2016/0233563 A1* | 8/2016 | Oshima | ............... | H01M 10/625 |

FOREIGN PATENT DOCUMENTS

| | | |
|---|---|---|
| JP | 2007-097338 | 4/2007 |
| JP | 2010-057292 A | 3/2010 |
| JP | 4992373 | 8/2012 |
| KR | 10-2008-0047055 | 5/2008 |
| KR | 10-2012-0048967 A | 5/2012 |
| KR | 10-2013-0044353 A | 5/2013 |

* cited by examiner

APPARATUS AND METHOD FOR CONTROLLING A HIGH VOLTAGE BATTERY IN VEHICLE

CROSS-REFERENCE TO RELATED APPLICATION

This application is based on and claims priority from Korean Patent Application No. 10-2014-0128682, filed on Sep. 25, 2014 in the Korean Intellectual Property Office, the disclosure of which is incorporated herein in its entirety by reference.

BACKGROUND

Field of the Invention

The present invention relates to an apparatus and method for controlling a high voltage battery in vehicle to ensure the stability of battery control via the corresponding control logic based on the failure of a temperature sensor, when the temperature sensor of the high voltage battery in vehicle fails.

Description of the Prior Art

In the control of the high battery of an environment-friendly vehicle (e.g., an electric vehicle and a hybrid vehicle, etc.), the current, voltage, and temperature measurements are significant when SOC (State Of Charge) calculation, output limit, diagnosis function, etc. are performed. by selecting the position of a temperature sensor by the condition capable of representing the battery temperature, the number of sensors is minimized and thus the effect of the cost reduction can be obtained.

However, according to the minimization of the number of the temperature sensor, when a particular sensor fails, in the control the battery system in which the characteristic is different based on the temperature condition, a significant influence may be caused on the control of the battery system, such as the acceleration of battery degradation based on an error of the SOC calculation and an error of output limit, the impossibility of the limit for the charging rate and the like. Additionally, when the failure of a high voltage battery occurs, due to an abnormal control of the battery, dangers for the acceleration of battery degradation and over-charging and over-discharging may exist, and to minimize such danger using multiple temperature sensors, production costs may increase.

SUMMARY

The present invention provides an apparatus and method for controlling a high voltage battery in vehicle that may ensure the improved stability of battery control via the temperature sensor position selection of a high voltage battery within environment-friendly vehicle and the corresponding control logic based on a temperature sensor failure.

A method for controlling a high voltage battery in vehicle according to an exemplary embodiment of the present invention may include: monitoring states of a first temperature sensor and a second temperature sensor mounted within a battery pack; detecting a faulty temperature sensor (e.g., a sensor failure) of the first temperature sensor and the second temperature sensor; and calculating a replacement temperature that corresponds to the faulty temperature sensor using a temperature deviation within the battery pack for each ambient temperature of the battery.

Additionally, the calculation of the replacement temperature may include: measuring an ambient temperature of the battery when the faulty temperature sensor is detected; determining a maximum temperature deviation within the battery pack based on the ambient temperature of the battery from a lookup table; and calculating the replacement temperature for replacing a measurement temperature of the faulty temperature sensor using the maximum temperature deviation read from the lookup table. The calculation of the replacement temperature may also include calculating a minimum temperature for replacing a measurement temperature of the first temperature sensor using the read maximum temperature deviation and a temperature measured via the second temperature sensor, when the faulty temperature sensor is the first temperature sensor.

Further, the minimum temperature may be a subtract of the read maximum temperature deviation from the measured temperature of the second temperature sensor. The calculation of the replacement temperature may further include calculating a maximum temperature for replacing a measurement temperature of the second temperature sensor using the read maximum temperature deviation and a temperature measured via the first temperature sensor, when the faulty temperature sensor is the second temperature sensor.

The maximum temperature may be a sum of the measured temperature of the first temperature sensor and the read maximum temperature deviation. The first temperature sensor may be disposed on a position selected through a temperature distribution analysis within the battery pack using a cooling simulation and may be configured to measure a minimum temperature within the battery pack. The second temperature sensor may be disposed on a position selected through a temperature distribution analysis within the battery pack using a cooling simulation and may be configured to measure a maximum temperature within the battery pack. The temperature deviation within the battery pack for each ambient temperature may be extracted by a deviation between a maximum temperature and a minimum temperature of temperatures measured within the battery pack based on an ambient temperature of the battery via a battery environmental test.

Furthermore, an apparatus for controlling a high voltage battery in vehicle according to an exemplary embodiment of the present invention may include: battery pack configured to supply a power for driving a vehicle; a first temperature sensor and a second temperature sensor configured to be mounted in different positions from each other within the battery pack; an ambient temperature sensor configured to be mounted extraneous to the battery pack and measure an ambient temperature of the battery; and a controller configured to monitor states of the first temperature sensor and the second temperature sensor, determine a maximum temperature deviation within the battery pack using a lookup table when either one temperature sensor of the first temperature sensor and the second temperature sensor fails, and calculate a replacement temperature for replacing a measurement temperature of the faulty temperature sensor using the determined maximum temperature deviation.

The first temperature sensor and the second temperature sensor may be disposed at positions to measure a minimum temperature and a maximum temperature within the battery pack, respectively, through a temperature distribution analysis within the battery pack using a cooling simulation. The temperature deviation within the battery pack for each ambient temperature may be extracted by a deviation between a maximum temperature and a minimum temperature of temperatures measured within the battery pack based on an ambient temperature of the battery through a battery environmental test.

The controller may be configured to calculate the replacement temperature using the maximum temperature deviation and a temperature measured by the second temperature sensor, when the faulty temperature sensor is the first temperature sensor. The controller may be configured to calculate the replacement temperature by subtracting the maximum temperature deviation from the temperature measured by the second temperature sensor. In addition, the controller may be configured to calculate the replacement temperature using the maximum temperature deviation and a temperature measured by the first temperature sensor, when the faulty temperature sensor is the second temperature sensor. The controller may be configured to calculate the replacement temperature by adding the maximum temperature deviation to the temperature measured by the first temperature sensor.

The present invention may ensure improved stability of battery control via the temperature sensor position selection of a high voltage battery in environment-friendly vehicle and the corresponding control logic based on the failure of a temperature sensor. The present invention may also reduce production cost by decreasing the number of temperature sensors for the high voltage battery.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION

Figure 1:
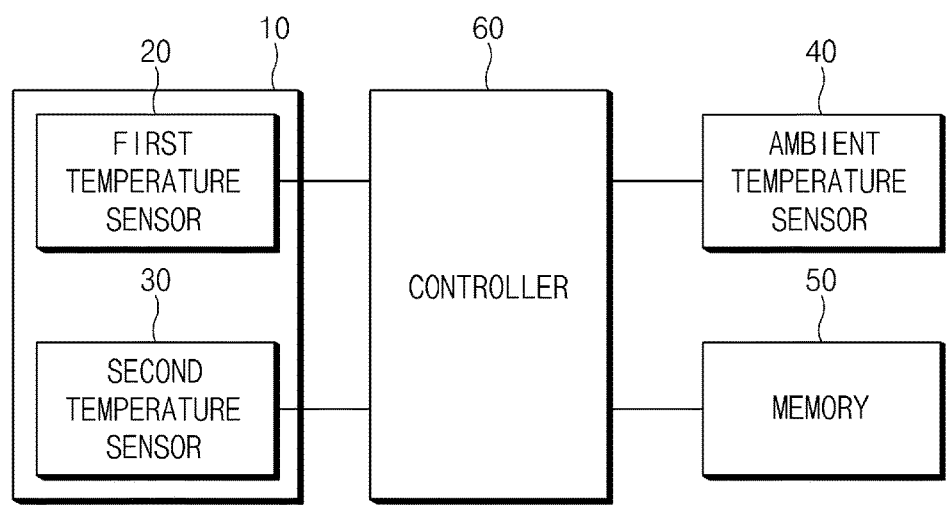
FIG. 1 is an exemplary block diagram showing a configuration of an apparatus for controlling a high voltage battery in vehicle according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments of the present invention will be explained in detail with reference to the accompanying drawings.

When the vehicle having a high voltage battery for driving a vehicle such as an electric vehicle and a hybrid vehicle is neglected after driving and when the internal temperature of the battery is greater than the ambient temperature of the battery, the temperature deviation may occur within the battery pack. For example, when the internal temperature of the battery is about 20° C. and the ambient temperature of the battery is about −35° C., the temperature of maximum about 14° C. may occur between the middle and the bottom of the battery. The present invention may be configured to calculate the replacement temperature for replacing the measurement value of the faulty temperature sensor and ensure improved stability of the battery control by using the replacement temperature for the battery.

Figure 2:
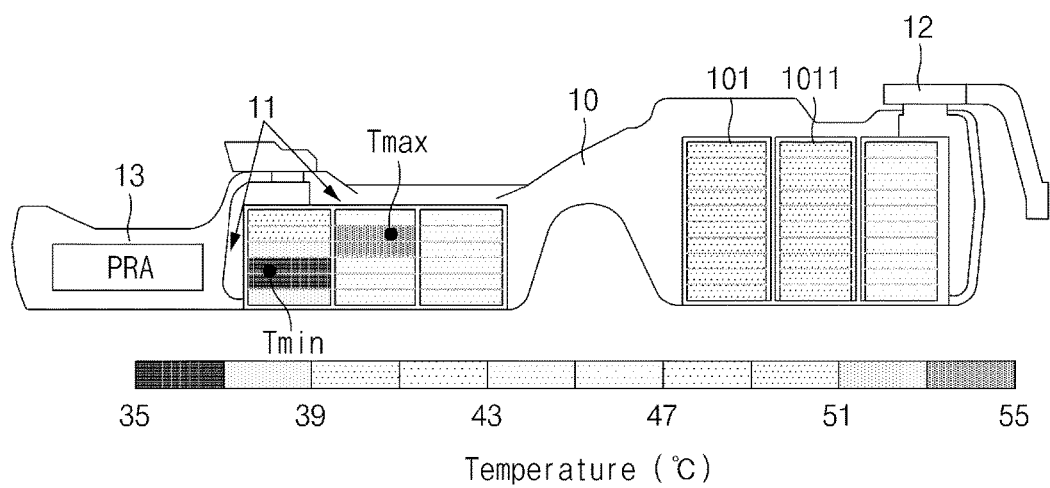
FIG. 2 is an exemplary temperature distribution chart of a high voltage battery according to a cooling simulation related to an exemplary embodiment of the present invention.
Figure 3:
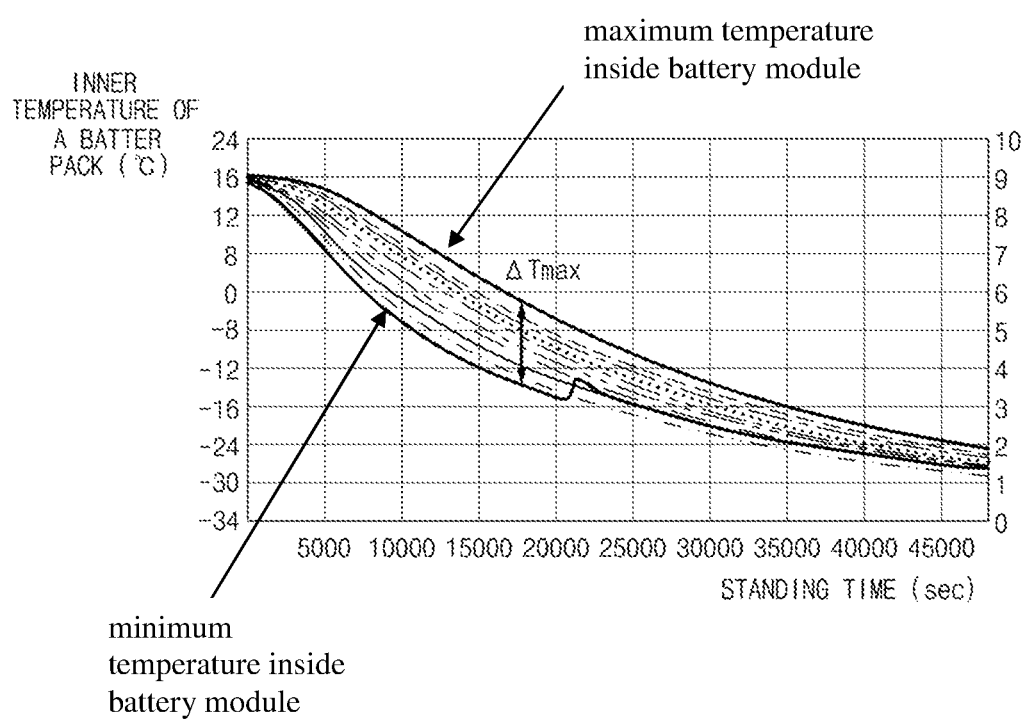
FIG. 3 is an exemplary graph showing the behavior of the temperature deviation within the battery pack according an ambient temperature related to an exemplary embodiment of the present invention.

FIG. 1 is an exemplary block diagram showing a configuration of an apparatus for controlling a high voltage battery in vehicle according to an exemplary embodiment of the present invention, FIG. 2 is an exemplary temperature distribution chart of a high voltage battery according to a cooling simulation related to an exemplary embodiment of the present invention, and FIG. 3 is an exemplary graph showing the behavior of the temperature deviation within the battery pack according an ambient temperature related to an exemplary embodiment of the present invention.

As shown in FIG. 1, an apparatus for controlling a high voltage battery in vehicle may include a battery pack 10, a first temperature sensor 20, a second temperature sensor 30, an ambient temperature sensor 40, a memory 50 and a controller 60. The battery pack 10 may be a high voltage battery configured to supply the power for driving a vehicle. Within the battery pack 10, a plurality of battery modules 101 may be laminated as shown in FIG. 2 and each of battery modules may include a plurality of battery cells 1011.

To cool the battery, an inlet duct 11 for introducing the exterior air and an outlet duct 12 for exhausting the air passing into the battery pack 10 from the exterior may be formed in the battery pack 10. In the present exemplary embodiment, the example of introducing the exterior air into the battery pack 10 is described, but it is not limited herewith, and may be implemented so that the inlet aperture is connected to the interior of the vehicle or the air conditioner and the cooled air is introduced into the battery pack 10. A PRA (Power Relay Assembly) 13 may be installed on one side of the battery pack 10, and the PRA 13 may be positioned between the battery and an electric motor and may be configured to connect or disconnect the battery and the electric motor.

The first temperature sensor 20 and the second temperature sensor 30 may be configured to measure the internal temperature of the battery pack 10. Any one temperature sensor 20 or 30 of the first temperature sensor 20 and the second temperature 30 may be installed at a position where the minimum temperature is formed in the battery pack 10, and the other temperature sensor 30 or 20 is installed at a position where the maximum temperature is formed in the battery pack 10.

The installation position of the first temperature sensor 20 and the second temperature sensor 30 may be selected by analyzing the temperature distribution within the battery pack 10 in the actual vehicle condition using a cooling simulator. In particular, to analyze the internal temperature distribution of the battery pack 10, by calculating the load ratio based on a vehicle type and performing a cooling simulation which may simulate the cooling flow and the cooling performance based on the shape of the battery pack 10, the position forming the maximum temperature (Tmax) and the position (Tmin) forming the minimum temperature in the battery pack 10 may be extracted as shown in FIG. 2.

The simulation conditions may use the battery ambient temperature, the maximum cooling air flow, the actual vehicle condition output profile (e.g., input/output energy), etc. when the cooling performance is maximized, as a input, and may set the internal shape and the cooling wind flow passage, etc. of the battery pack as a cooling factor. The ambient temperature sensor 40 may be mounted extraneous to the battery pack 10 and may be configured to measure the ambient temperature of the battery (hereinafter, ambient temperature).

The maximum temperature and minimum temperature within the battery pack measured by the first temperature sensor 20 and the second temperature sensor 30 may be stored in the memory 50. The maximum temperature and minimum temperature may be used to control the battery. The maximum temperature deviation information within the battery pack for each ambient temperature may be stored as a lookup table type in the memory 50. The maximum temperature deviation for each ambient temperature may be extracted by a battery environmental test, as described hereinbelow.

First, on the each battery module 101 and cell 1011 position within the battery pack 10, the temperature sensor may be mounted, respectively, and may be positioned in the test equipment (e.g., environmental chamber) wherein a temperature condition test may be produced. The initial temperature of the battery pack 10 may be maintained to about room temperature (25° C.), and the temperature in the test equipment may be set to the ambient temperature. While maintaining the set ambient temperature during about 12 hours, the temperature measurement values of the temperature sensors mounted within the battery pack 10 may be monitored (see FIG. 3). After the test is completed, the deviation of the maximum temperature and minimum temperature of the temperature measurement values measured for each ambient temperature may be extracted (e.g., calculated). Through this process, the maximum temperature deviation table (e.g., lookup table) within the battery pack 10 for each ambient temperature may be generated.

The controller 60 may include a BMS (battery management system) configured to manage the overall state of the battery and a control logic when the temperature sensor fails. The controller 60 may be configured to consistently monitor the states of the first temperature sensor 20 and the second temperature sensor 30. When at least one of the first temperature sensor 20 and the second temperature sensor 30 fails, the controller 60 may be configured to detect the failure. When the failure of the temperature sensor is detected, the controller 60 may be configured to determine the position of the faulty sensor. In other words, the controller 60 may be configured to determine that the first temperature sensor 20 or the second temperature sensor 30 fails (e.g., may be configured to determine which of the two sensors has failed). In particular, the first temperature sensor 20 and the second temperature sensor 30 may be mounted at positions which are different from each other within the battery pack 10. When the first temperature sensor 20 fails, the controller 60 may be configured to measure the maximum temperature within the battery pack 10 via the second temperature sensor 30, and measure the ambient temperature via the ambient temperature sensor 40.

The controller 60 may be configured to determine or read the maximum temperature deviation based on the measured ambient temperature using the lookup table previously stored in the memory 50. In addition, the controller 60 may be configured to calculate the minimum temperature using the measured maximum temperature and the maximum temperature deviation. Particularly, the minimum temperature may be obtained by subtracting the maximum temperature deviation from the measured maximum temperature.

When the second temperature sensor 30 fails, the controller 60 may be configured to calculate the maximum temperature using the minimum temperature measured via the first temperature sensor 20 and the maximum temperature deviation based on the ambient temperature measured via the ambient temperature sensor 40. In particular, the maximum temperature may be obtained by adding the minimum temperature deviation to the minimum temperature measured via the first temperature sensor 20. In other words, the controller 60 may be configured to calculate the replacement temperature to replace the measurement temperature of the faulty temperature sensor.

The controller 60 may also be configured to update the maximum temperature or minimum temperature previously stored in the memory 50 to the calculated maximum temperature or minimum temperature. The controller 60 may be configured to then operate the battery using the updated maximum temperature or minimum temperature. When the controller 60 detects the failure of the temperature sensor 20 or 30 or 40, the controller may be configured to enable the user to recognize the failure by visually or acoustically outputting a notification to the user.

Figure 4:
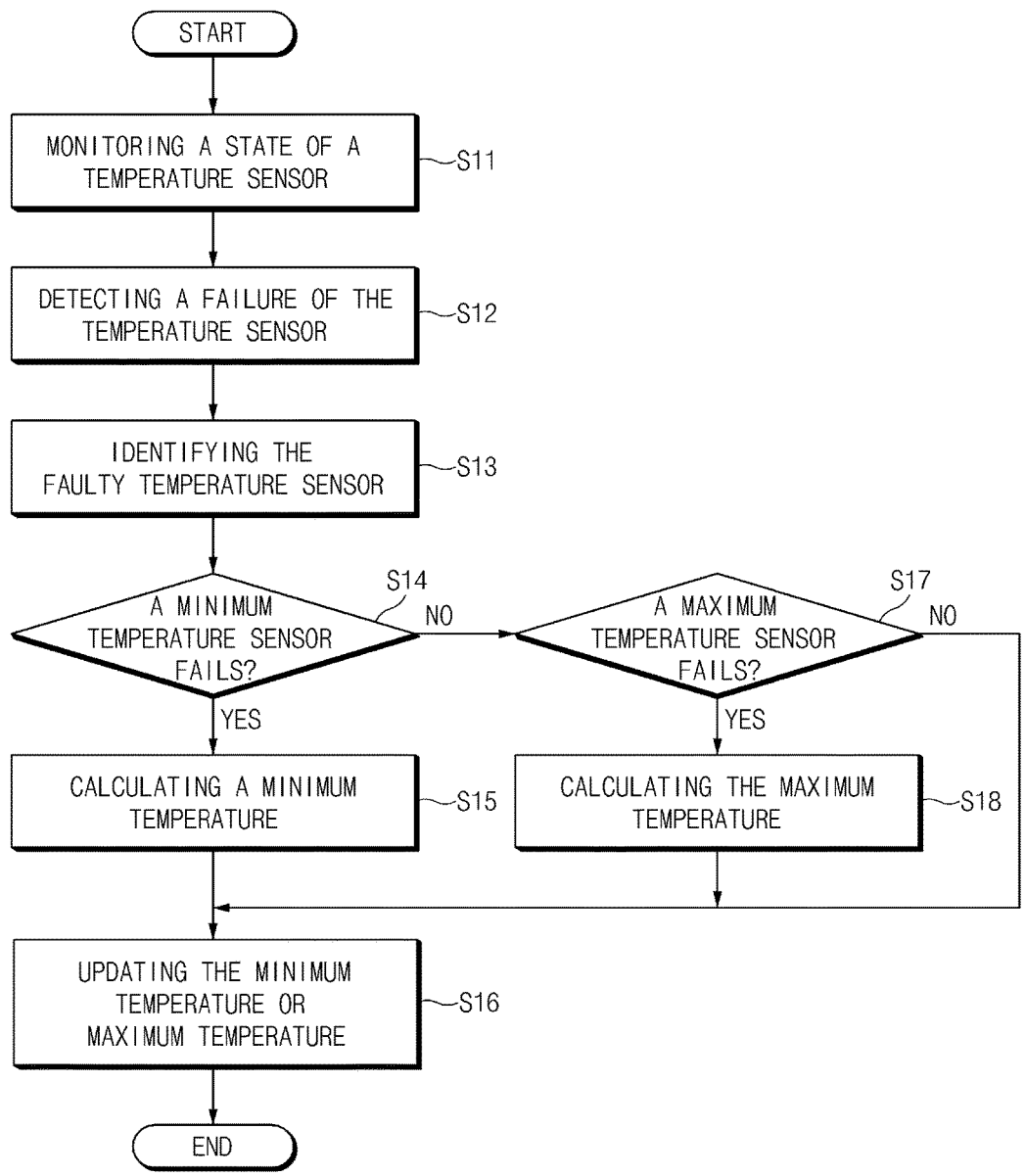
FIG. 4 is an exemplary flow chart showing a method for controlling a high voltage battery in vehicle according to an exemplary embodiment of the present invention.

FIG. 4 is an exemplary flow chart showing a method for controlling a high voltage battery in vehicle according to an exemplary embodiment of the present invention. The controller 60 may be configured to monitor the states of the first temperature sensor 20 and the second temperature sensor 30 mounted within the battery pack 10 (S11). In particular, the first temperature sensor 20 and the second temperature sensor 30 may be installed at different positions within the battery pack 10. In other words, the first temperature sensor 20 may be disposed at a position to measure the minimum temperature and the second temperature sensor 30 may be disposed at a position to measure the maximum temperature. In the present embodiment, to assist in understanding of the invention, the example, in which the first temperature sensor 20 and the second temperature sensor 30 are installed to measure the minimum temperature and the maximum temperature, respectively, is described, but the first temperature sensor 20 and the second temperature sensor 30 may be installed at a position to measure the maximum temperature and a position to measure the minimum temperature, respectively.

The controller 60 may be configured to detect the failure of the temperature sensor by monitoring two temperature sensors 20, 30 (S12). When the failure of the temperature is detected, the controller 60 may be configured to determine that either temperature sensor of two temperature sensors fails 20, 30 (S13). When the faulty sensor is identified, the controller 60 may be configured to read the maximum temperature deviation within the battery pack based on the ambient temperature from the lookup table, and calculate the replacement temperature for replacing the measurement temperature of the faulty temperature sensor using the read maximum temperature deviation. Then, the controller 60 may be configured to use the calculated replacement temperature to operate the battery.

Moreover, the process of calculating the replacement temperature will be described in detail. When the first temperature sensor 20 installed at the position to measure the minimum temperature fails, the controller 60 may be configured to calculate the minimum temperature to replace the actual minimum temperature of the first temperature sensor 20 using the read maximum temperature deviation and the maximum temperature within the battery pack 10 measured via the second temperature sensor 30 (S14, S15). In particular, the minimum temperature may be obtained by subtracting the read maximum temperature deviation from the actual maximum temperature. Subsequently, the controller 60 may be configured to update the measurement temperature of the first temperature sensor 20 to the calculated minimum temperature (S16).

Additionally, when the second temperature sensor 30 installed at the position to measure the maximum temperature fails, the controller 60 may be configured to calculate the maximum temperature to replace the actual maximum temperature of the second temperature sensor 30 using the read maximum temperature deviation and the minimum temperature within the battery pack 10 measured via the first temperature sensor 20 (S17, S18). In particular, the maximum temperature may be obtained by adding the read maximum temperature deviation to the actual minimum temperature.

What is claimed is:

1. A method for controlling a high voltage battery in vehicle, comprising:
    generating, by a controller, a lookup table having a maximum temperature deviation within a battery pack;
    monitoring, by the controller, states of a first temperature sensor for minimum temperature within the battery pack and a second temperature sensor for maximum temperature within the battery pack among two temperature sensors installed within the battery pack wherein installation positions of the first temperature sensor and the second temperature sensor are determined using a cooling simulator;
    detecting, by the controller, a faulty temperature sensor of the first temperature sensor and the second temperature sensor;
    measuring, by an ambient temperature sensor, an ambient temperature of the battery when the faulty temperature sensor is detected by the controller;
    reading, by the controller, the maximum temperature deviation within the battery pack based on the ambient temperature of the battery pack from the lookup table;
    calculating, by the controller, a replacement temperature to replace a measurement of the faulty temperature sensor using the maximum temperature deviation read from the lookup table;
    wherein the calculation of the replacement temperature includes:
        calculating, by the controller, a minimum temperature to replace a measurement temperature of the first temperature sensor by subtracting the read maximum temperature deviation from the measured temperature of the second temperature sensor, when the faulty temperature sensor is the first temperature sensor; and
        calculating, by the controller, a maximum temperature to replace a measurement temperature of the second temperature sensor using a sum of the measured temperature of the first temperature sensor and the read maximum temperature deviation, when the faulty temperature sensor is the second temperature sensor; and
    operating, by the controller, the battery based on the replacement temperature,
    wherein the generating of the lookup table includes:
        calculating, by the controller, a first maximum temperature deviation using a deviation between a maximum temperature and a minimum temperature among temperature measurement values of the first temperature sensor and the second temperature sensor in the battery pack for a predetermined time when the battery pack is set to a first ambient temperature;
        storing, by the controller, the first maximum temperature deviation calculated;
        calculating, by the controller, a second maximum temperature deviation using a deviation between a maximum temperature and a minimum temperature among temperature measurement values of the first temperature sensor and the second temperature sensor in the battery pack for a predetermined time when the battery pack is set to a second ambient temperature; and
        storing, by the controller, the second maximum temperature deviation calculated in the lookup table.

2. A method for controlling a high voltage battery in vehicle according to claim 1, wherein the first temperature sensor is installed at a position selected through a temperature distribution analysis within the battery pack using a cooling simulation and is configured to measure the minimum temperature within the battery pack.

3. A method for controlling a high voltage battery in vehicle according to claim 1, wherein the second temperature sensor is installed at a position selected through a temperature distribution analysis within the battery pack using a cooling simulation and is configured to measure the maximum temperature within the battery pack.

4. A method for controlling a high voltage battery in vehicle according to claim 1, wherein the temperature deviation within the battery pack for each ambient temperature is extracted by a deviation between the maximum temperature and the minimum temperature of temperatures measured within the battery pack based on an ambient temperature of the battery.

5. An apparatus for controlling a high voltage battery in vehicle, comprising:
   a battery pack configured to supply a power for driving a vehicle;
   a first temperature sensor and a second temperature sensor installed in different positions from each other among two temperature sensors installed within the battery pack wherein installation positions of the first temperature sensor and the second temperature sensor are determined using a cooling simulator; and
   an ambient temperature sensor mounted extraneous to the battery pack and configured to measure an ambient temperature of the battery; and
   a controller configured to:
      generate a lookup table having a maximum temperature deviation within the battery pack;
      monitor states of the first temperature sensor for minimum temperature within the battery pack and the second temperature sensor for maximum temperature within the battery pack;
      read the maximum temperature deviation within the battery pack from the lookup table when either one temperature sensor of the first temperature sensor and the second temperature sensor fails;
      calculate a replacement temperature to replace a measurement temperature of the faulty temperature sensor using the read maximum temperature deviation,
      wherein the controller is configured to calculate the replacement temperature by subtracting the maximum temperature deviation from the temperature measured by the second temperature sensor, when the faulty temperature sensor is the first temperature sensor,
      wherein the controller is configured to calculate the replacement temperature using a sum of the maximum temperature deviation and the temperature measured by the first temperature sensor, when the faulty temperature sensor is the second temperature sensor; and
      operate the battery based on the replacement battery, and
   wherein the controller is configured to:
      calculate a first maximum temperature deviation using a deviation between a maximum temperature and a minimum temperature among temperature measurement values of the first temperature sensor and the second temperature sensor in the battery pack for a predetermined time when the battery pack is set to a first ambient temperature deviation;
      store the first maximum temperature calculated in the lookup table;
      calculate a second maximum temperature deviation using a deviation between a maximum temperature and a minimum temperature among temperature measurement values of the first temperature sensor and the second temperature sensor in the battery pack for a predetermined time when the battery pack is set to a second ambient temperature; and
      store the second maximum temperature deviation calculated in the lookup table.

6. An apparatus for controlling a high voltage battery in vehicle according to claim 5, wherein the first temperature sensor and the second temperature sensor are installed at positions to measure the minimum temperature and the maximum temperature within the battery pack, respectively, through a temperature distribution analysis within the battery pack using a cooling simulation.

7. An apparatus for controlling a high voltage battery in vehicle according to claim 5, wherein the temperature deviation within the battery pack for each ambient temperature is extracted by a deviation between the maximum temperature and the minimum temperature of temperatures measured within the battery pack based on an ambient temperature of the battery.

8. A non-transitory computer readable medium containing program instructions executed by a controller, the computer readable medium comprising:
   program instructions that control a battery pack configured to supply a power for driving a vehicle;
   program instructions that control a first temperature sensor and a second temperature sensor installed in different positions from each other among two temperature sensors installed within the battery pack, wherein installation positions of the first temperature sensor and the second temperature sensor are determined using a cooling simulator;
   program instructions that control an ambient temperature sensor mounted extraneous to the battery pack and configured to measure an ambient temperature of the battery; and
   program instructions that generate a lookup table having a maximum temperature deviation within the battery pack;
   program instructions that monitor states of the first temperature sensor for minimum temperature within the battery pack and the second temperature sensor for maximum temperature within the battery pack;
   program instructions that read the maximum temperature deviation within the battery pack from the lookup table when either one temperature sensor of the first temperature sensor and the second temperature sensor fails;
   program instructions that calculate a replacement temperature to replace a measurement temperature of the faulty temperature sensor using the read maximum temperature deviation;
   program instructions that calculate a minimum temperature to replace a measurement temperature of the first temperature sensor by subtracting the read maximum temperature deviation from the measured temperature of the second temperature sensor, when the faulty temperature sensor is the first temperature sensor;
   program instructions that calculate a maximum temperature to replace a measurement temperature of the second temperature sensor using a sum of the measured temperature of the first temperature sensor and the read maximum temperature deviation, when the faulty temperature sensor is the second temperature sensor; and program instructions that operate the battery based on the replacement temperature, wherein the program instructions that generate the lookup table further include:

program instructions that calculate a first maximum temperature deviation using a deviation between a maximum temperature and a minimum temperature among temperature measurement values of the first temperature sensor and the second temperature sensor in the battery pack for a predetermined time when the battery pack is set to a first ambient temperature deviation;

program instructions that store the first maximum temperature calculated in the lookup table;

program instructions that calculate a second maximum temperature deviation using a deviation between a maximum temperature and a minimum temperature among temperature measurement values of the first temperature sensor and the second temperature sensor in the battery pack for a predetermined time when the battery pack is set to a second ambient temperature; and program instructions that store the second maximum temperature deviation calculated in the lookup table.

9. The non-transitory computer readable medium of claim 8, wherein the first temperature sensor and the second temperature sensor are installed at positions to measure the minimum temperature and the maximum temperature within the battery pack, respectively, through a temperature distribution analysis within the battery pack using a cooling simulation.

10. The non-transitory computer readable medium of claim 8, wherein the temperature deviation within the battery pack for each ambient temperature is extracted by a deviation between the maximum temperature and the minimum temperature of temperatures measured within the battery pack based on an ambient temperature of the battery.

* * * * *